US 11,047,371 B2

(12) United States Patent
Rosenkranz et al.

(10) Patent No.: US 11,047,371 B2
(45) Date of Patent: Jun. 29, 2021

(54) PROCESS PUMP HAVING A CRANK DRIVE (71) Applicant: SPX FLOW TECHNOLOGY NORDERSTEDT GMBH, Norderstedt (DE)

(72) Inventors: Georg Rosenkranz, Norderstedt (DE); Thomas Riel, Kisdorf (DE); Christian Huhnke, Bad Bramstedt (DE)

(73) Assignee: SPX Flow Technology Norderstedt GmbH, Norderstedt (DE)

( * ) Notice: Subject to any disclaimer, the term of this patent is extended or adjusted under 35 U.S.C. 154(b) by 157 days.

(21) Appl. No.: 15/544,922

(22) PCT Filed: Jan. 13, 2016

(86) PCT No.: PCT/EP2016/050566
§ 371 (c)(1),
(2) Date: Jul. 20, 2017

(87) PCT Pub. No.: WO2016/116334
PCT Pub. Date: Jul. 28, 2016

(65) Prior Publication Data
US 2018/0017045 A1 Jan. 18, 2018

(30) Foreign Application Priority Data
Jan. 22, 2015 (DE) .......................... 102015201071.6

(51) Int. Cl.
*F04B 9/04* (2006.01)
*F04B 53/00* (2006.01)
(Continued)

(52) U.S. Cl.
CPC ............ *F04B 9/045* (2013.01); *F04B 53/006* (2013.01); *F04B 1/00* (2013.01); *F04B 1/143* (2013.01); *F04B 53/144* (2013.01); *F16C 7/023* (2013.01)

(58) Field of Classification Search
CPC ...... F04B 9/045; F04B 53/006; F04B 53/144; F04B 1/143; F04B 1/0404; F04B 1/0408;
(Continued)

(56) References Cited

U.S. PATENT DOCUMENTS 1,732,147 A * 10/1929 Franklin ............... F01B 13/068
123/44 C
2,131,749 A * 10/1938 Ofeldt ..................... F04B 15/02
417/506
(Continued)

FOREIGN PATENT DOCUMENTS

CN 1065513 C 10/1992
CN 1413292 A 4/2003
(Continued)

OTHER PUBLICATIONS

International Search Report from PCT/EP2016/050566; dated Mar. 23, 2016.

*Primary Examiner* — Dustin T Nguyen
(74) *Attorney, Agent, or Firm* — BakerHostetler (57) ABSTRACT

The present invention relates to a process pump having a crank mechanism (1) and at least three cylinders that represent a first cylinder, a second cylinder and a third cylinder when seen clockwise or counterclockwise around the crank mechanism (1), wherein the crank mechanism (1) has a vertical crankshaft and for each cylinder a crosshead (7, 10, 13) each and a connecting rod (8, 11, 14), each having a large connecting rod top end (8a, 11a) for receiving the crankshaft, wherein the crossheads (7, 10, 13) are functionally connected to the crankshaft via the connecting rods (8, 11, 14). The invention is characterized in that the crankshaft is formed as an eccentric shaft (5) with a first eccentric and a second eccentric, wherein the connecting rod (8) of the first cylinder and the connecting rod (14) of the third cylinder are arranged on the first eccentric, and wherein the
(Continued)

connecting rod (11) of the second cylinder is arranged on the second eccentric, so that the large connecting rod top end (8a) of the connecting rod (8) of the first cylinder and the large connecting rod top end of the connecting rod (14) of the third cylinder have a common central axis.

10 Claims, 10 Drawing Sheets

(51) Int. Cl.
    *F16C 7/02*           (2006.01)
    *F04B 1/00*           (2020.01)
    *F04B 1/143*         (2020.01)
    *F04B 53/14*         (2006.01)

(58) Field of Classification Search
    CPC ........ F04B 9/1095; F04B 25/00; F04B 25/04;
                    F04B 27/00; F04B 27/04; F04B
                    27/05636; F04B 27/0538; F16C 7/023;
                    F02B 75/224; F02B 2075/1812
    USPC .... 417/237, 248, 255, 258, 273, 491; 92/72,
                      92/73, 148; 91/491, 493, 494, 495
    See application file for complete search history.

(56) References Cited

U.S. PATENT DOCUMENTS

| | | | | |
|---|---|---|---|---|
| 2,239,853 A * | 4/1941 | Harold | ................ | F04B 53/00 92/261 |
| 2,899,247 A * | 8/1959 | Clarkson | ................ | F22D 11/02 92/73 |
| 3,249,062 A | 5/1966 | Coberly et al. | | |
| 3,595,101 A | 7/1971 | Cooper, Jr. | | |
| 3,605,564 A * | 9/1971 | Shoemaker | ........... | F01B 13/068 91/495 |
| 3,692,434 A * | 9/1972 | Schnear | ................ | F04B 27/053 417/266 |
| 4,050,862 A * | 9/1977 | Buse | ......................... | F04B 1/00 417/539 |
| 6,776,587 B2 * | 8/2004 | Meyer | .................... | F04B 25/00 417/248 |
| 2003/0108435 A1 | 6/2003 | Meyer et al. | | |
| 2007/0098580 A1 * | 5/2007 | Petersen | ................ | F04B 1/0413 417/491 |
| 2009/0092510 A1 | 4/2009 | Williams et al. | | |
| 2011/0038740 A1 * | 2/2011 | Goertzen | ........... | F04B 27/0414 417/273 |

FOREIGN PATENT DOCUMENTS

| | | | | |
|---|---|---|---|---|
| CN | 1932286 A | 3/2007 | | |
| CN | 102575520 A | 7/2012 | | |
| CN | 202811258 U | 3/2013 | | |
| DE | 10 2012 203020 A1 | 9/2012 | | |
| EP | 1736666 A1 | 12/2006 | | |
| JP | 64-21245 A | 1/1989 | | |
| JP | H0826778 B2 * | 1/1989 | ............ | F02B 75/224 |
| JP | 2003-519740 A | 6/2003 | | |
| JP | 2007-2848 A | 1/2007 | | |
| WO | WO/2013/116820 A1 | 8/2013 | | |

\* cited by examiner

PROCESS PUMP HAVING A CRANK DRIVE

CROSS-REFERENCE TO RELATED PATENT APPLICATIONS

The present application is a National Stage of International Patent Application No. PCT/EP2016/050566, filed Jan. 13, 2016, entitled "Process Pump Having A Crank Drive" and claims the priority of German Patent Application No. 10 2015 201 071.6, filed on Jan. 22, 2015, the disclosures of which are incorporated herein by reference in their entirety.

The present invention relates to a process pump with a crank mechanism. In particular, the invention relates to a process pump with several cylinders each having a crosshead as the connecting element to a connecting rod, wherein the crossheads are functionally connected to a crankshaft via the connecting rods.

Generally, such process pumps with several cylinders are employed for pumping large pump rates and/or at high pressures. One problem with such process pumps are the relative large space requirements, since the pump heads constructively need a certain distance to each other, in particular when membrane pump heads are used. A process pump is meant to be an oscillating positive displacement pump with a fixed stroke length.

With known process pumps with crank mechanisms the cylinders are arranged in parallel in series and supported along the crankshaft. In this case, a large cylinder distance in the connection area for the pump heads also means a large bearing span on the crankshaft. With several cylinders and large pump heads, in particular with membrane pump heads, the crankshaft has to be correspondingly long. In turn, this requires special properties of the crankshaft, in particular in view of stability and bending strength. Because of that and due to the high space requirements there come about high costs in production and storage.

To solve this problem in EP 1 736 666 B1 it is suggested that the cylinders are arranged in a fan-shaped manner to each other, so that a vertical offset between the cylinders is quite low or no vertical offset is present at all. In particular, EP 1 736 666 B1 suggests distributing three cylinders over a quadrant around the crankshaft, wherein the cylinders have a vertical offset of about the thickness of a connecting rod to each other. Alternatively, it is suggested in EP 1 736 666 B1 to use cranked connecting rods, so that all cylinders lie in a plane perpendicular to the crankshaft. By this arrangement of the cylinders the space requirements for a pump having such a crank mechanism can drastically be reduced, wherein at the same time also the production costs can be decreased.

Such process pumps inherently generate high mass accelerations in the pumped fluid, so that for process-related reasons a uniform pump characteristic is aimed at. With multi-cylinder pumps this is the resulting total pump rate, that is the total pump rate resulting form the pump rates of the individual cylinders. A substantially homogeneous total pump rate acts favorably on the torque characteristic of the pump drive as well as particularly on the pressure and pump rate fluctuations in the subsequent members, that is for example in the pipes. Thus, due to said solution the costs for a suitable pump drive can be kept within manageable limits. At the same time, by savings in measures to optimize the pipes there can also be achieved a cost reduction, since smaller vibration dampers or resonators can be used or it can even be completely refrained from them.

The solution suggested in EP 1 736 666 B1 is already very suitable for the employment on so-called FPSO units (Floating Production Storage & Offloading), that is for example on drilling ships that at the same time also process and temporarily store the pumped crude oil. However, in the pumps used for that there is increasingly required more pump performance per unit area. In particular, with very large pumps then unbalances of the moving parts can be particularly detrimental, since the resulting dynamic stimulations can be a problem, in particular in ships. As an example, here the probability for a fatigue failure increased by the vibrations may be mentioned.

Thus, it is the object of the present invention to provide a process pump with a crank mechanism in which a high uniformity of the resulting total pump rate can be achieved, but wherein at the same time unbalances are substantially avoided.

The problem is solved with a process pump according to claim 1. Advantageous developments are described in the dependent claims.

The process pump according to the invention has a crank mechanism and at least three cylinders. The cylinders when seen around the crank mechanism represent a first cylinder, a second cylinder and a third cylinder. The crank mechanism has a crankshaft and for each cylinder a crosshead each and a connecting rod, each having a large connecting rod top end for receiving the crankshaft. The crossheads are functionally connected to the crankshaft via the connecting rods.

The process pump according to the invention over the prior art mentioned at the start is characterized in that the crankshaft is formed as an eccentric shaft having a first eccentric and a second eccentric, wherein the connecting rod of the first cylinder and the connecting rod of the third cylinder are arranged on the first eccentric, and wherein the connecting rod of the second cylinder is arranged on the second eccentric, so that the large connecting rod top end of the connecting rod of the first cylinder and the large connecting rod top end of the connecting rod of the third cylinder have a common central axis. In other words, the large connecting rod top end of the connecting rod of the second cylinder is supported on the second eccentric and the large connecting rod top ends of the connecting rods of the first and of the third cylinder are supported on the first eccentric, so that the large connecting rod top ends of the connecting rods of the first and of the third cylinder can pivot about a common central axis.

This arrangement has the advantage that also with large process pumps and correspondingly high pump performances or correspondingly high pressures a uniform pump rate is achieved and the vibrations occurring due to the unbalances of the moving parts are markedly reduced over the solutions known from the prior art. Thus, a process pump according to the invention, if at all, requires only relatively small balancing masses to eliminate or minimize the resulting vibrations. Accordingly, such a process pump is particularly suitable for the employment on FPSO units and takes into account the increased requirements in this field.

A further advantage of the process pump according to the present invention can be seen in that the parts used can be standardized. In this way, except for the drive train substantially all parts of the crank mechanism, such as for example the eccentric shaft, the connecting rods, and the crossheads are independent of the pump head employed and thus, no specific adaptions have to be made. The crank mechanism in an unchanged manner can be used both for single and double-acting pump heads. This results in a significant cost reduction of the process pump according to the present invention, since an essential number of individual components are suitable for a plurality of different types of pumps.

Preferably, the process pump has exactly three cylinders. In this way, a particularly simple construction with a simultaneous reduction of unbalances can be achieved.

Suitably, the process pump has the control sequence: first cylinder—third cylinder—second cylinder. In this context it is also of advantage if the axes of adjacent cylinders have an angular offset of 60° to each other. Thus, in case of three cylinders there results an arrangement of 120°, i.e. the maximum angle between the axes of the two cylinders being furthest apart from each other is 120°. Here, the axis of a cylinder shall mean the central axis of a cylinder that extends substantially perpendicular from the rotational axis of the crankshaft or the eccentric shaft. In particular, if the two eccentrics of the eccentric shaft are offset by 180° to each other this arrangement has the advantage that an optimum phase offset of 120° of the individual pump rates of each cylinder is formed, so that a very homogeneous resulting total pump rate is formed. Here, the angles between the axes or the angular offset, respectively, are to be understood such that to determine them the axes are projected onto a common plane arranged perpendicularly to the rotational axis of the eccentric shaft, so that possible height offsets along the eccentric shaft are disregarded.

Here it is expedient if the angular offset between the axis of the first cylinder and the axis of the third cylinder is 120°. Thus, in case of the control sequence first cylinder—third cylinder—second cylinder the middle cylinder can be arranged on the lowest position, whereby in addition to the above-mentioned advantages a particularly compact and space-saving crank mechanism—and thus, a corresponding process pump—can be realized.

Preferably, at least one of the two eccentrics, preferably both, is/are formed as an eccentric disc. Eccentric discs have the advantage that during operation they allow a good force distribution within the crankshaft or eccentric shaft, so that there cannot occur a permanent fatigue fracture or the like.

It is also of advantage if the first eccentric and the second eccentric are arranged on the eccentric shaft by an offset of 180°. This type of arrangement reduces the unbalance in the crank mechanism during operation, allows a uniform phase offset of the resulting partial pump rates of the individual cylinders, and, in addition, allows an even more compact design.

Suitably, the connecting rods each have a connecting rod shank and a small connecting rod top end for functional connection with the crossheads, wherein the large connecting rod top end, the connecting rod shank, and the small connecting rod top end of each of the connecting rods are formed as one piece. This has the advantage that on the one hand the connecting rods can be made at a good price, since they are of only one piece. On the other hand, there also arises the advantage of an easier installation, since the connecting rods only have to be slipped on the bearing surface on the eccentric shaft intended therefore. Furthermore, one-piece connecting rods during operation of double-acting pump heads are of advantage, since contrary to divided connecting rods no connecting bolts are loaded that could be subject to a fatigue fracture. Of course, here it is conceivable to additionally use corresponding bearing means, that is for example rolling bearings, such as ball or roller bearings or also sliding bearings for optimum support of the connecting rods. Also, the axial distance of the connecting rods to one another can be adjusted by appropriate sliding discs.

In a further development the eccentric shaft is formed as one piece. A one-piece eccentric shaft has the advantage that there results a better force distribution within the eccentric shaft, since the eccentric shaft does not require a positive connection of two shaft parts. Further, the crank mechanism can be more easily and quickly mounted or detached for maintenance purposes. Finally, in this way the crank mechanism or the process pump is also inexpensive to manufacture.

In a further development, a balancing mass is arranged on the eccentric shaft. Said balancing mass serves to further reduce or eliminate the unbalances—and thus, occurring vibrations—during operation. Further, in this way also the wear of the bearings of the eccentric shaft can be reduced. Here, trials have shown that a balancing mass is able to reduce the unbalance forces occurring during operation in the X direction and Y direction—that is in the directions extending perpendicular to the rotational axis of the eccentric shaft—up to 50%. It is conceivable that the balancing mass can be set via a tooth system or the like in the radial location with respect to the eccentric shaft. To set the balancing mass in the axial direction suitable clamping or fixing means can be used. It is particularly advantageous if the balancing mass as seen in the axial direction of the eccentric shaft is arranged upstream of the first cylinder on one end of the eccentric shaft, so that possible adaptions regarding the balancing mass can be made quickly and easily without having to detach the entire crank mechanism.

It is suitable if the process pump according to the present invention has at least one pump head that can be formed as a single acting or double-acting pump head depending on the requirements. Preferably, all cylinders are provided with single-acting or double-acting pump heads. Single-acting pump heads over double-acting pump heads have the advantage that the space required is somewhat lower. Therefore, these pump heads are particularly suitable in case of cramped set up conditions for the process pump. Double-acting pump heads have the advantage that they allow the double pump rate, since they generate a pump action in both directions of movement of the piston rod.

Preferably, at least one pump head is formed as a membrane pump head, but it is also conceivable to use piston pump heads. The piston pump heads may also be designed single-acting or double-acting. In particular, membrane pump heads have the advantage that the pumped fluid is hermetically sealed to the atmosphere and thus, a contact of the pumped fluid with the environment or parts of the pump drive is prevented. When using double-acting pump heads, in particular with double-acting membrane pump heads, at the same time a large total pump rate can be achieved.

In the following the invention is explained in detail with the help of examples illustrated in the drawings. Here.

Figure 1:
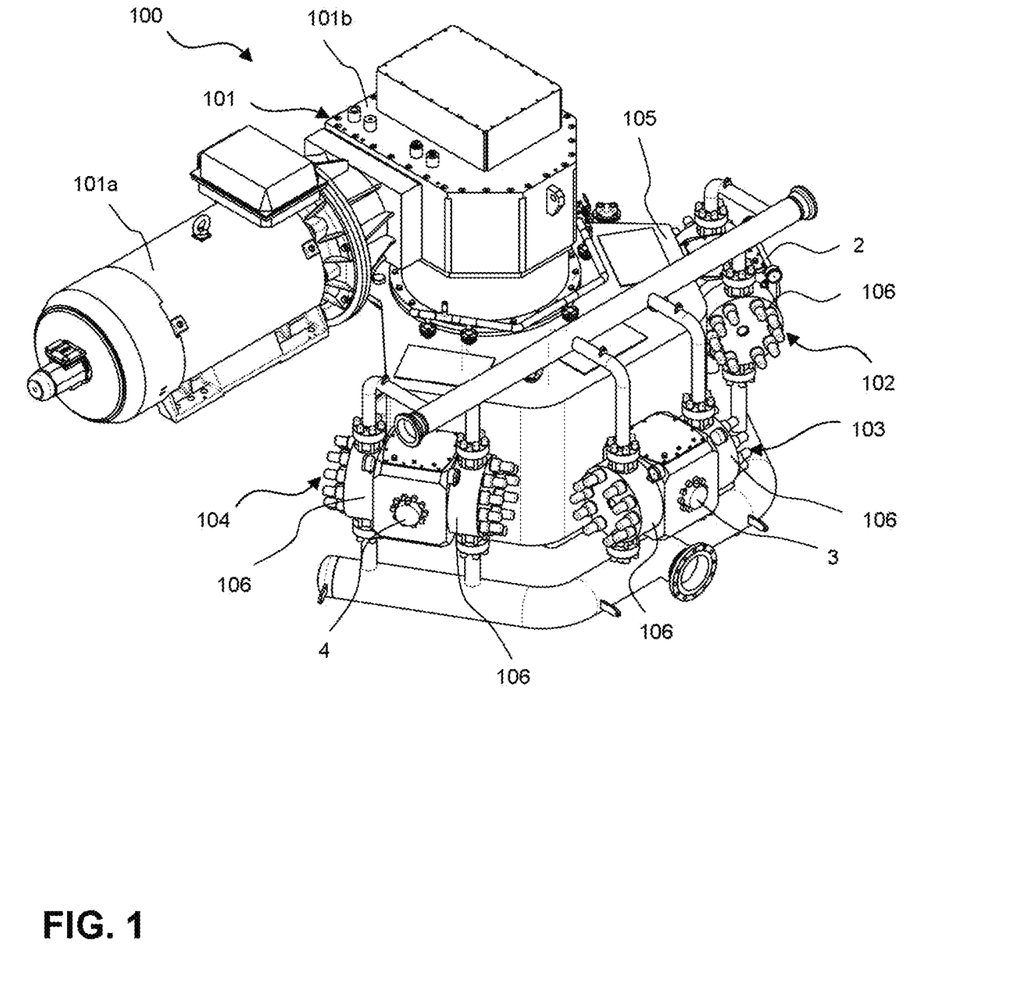
FIG. 1 schematically shows a perspective view of a process pump according to the present invention with double-acting pump heads.

A process pump 100 according to the present invention is illustrated in FIG. 1. The process pump 100 has three cylinders 2, 3, 4 that represent a first cylinder 2 (the back most cylinder in FIG. 1), a second cylinder 3 (the middle cylinder in FIG. 1) and a third cylinder 4 (the front cylinder in FIG. 1) when seen clockwise or counterclockwise. In the following, members designated with "first", "second", "third" or the like are meant to be assigned to the corresponding cylinder 2, 3, 4.

Moreover, it is seen in FIG. 1 that the process pump 100 hast double-acting pump heads 102, 103, 104 that in addition to cylinders 2, 3, 4 each have two pump lids 106 to which the pipes are mounted that lead to the suction or delivery line. Further, the process pump 100 has a drive 101 (for example an electric motor 101a and a step-down gear 101b) and a casing 105.

Figure 2:
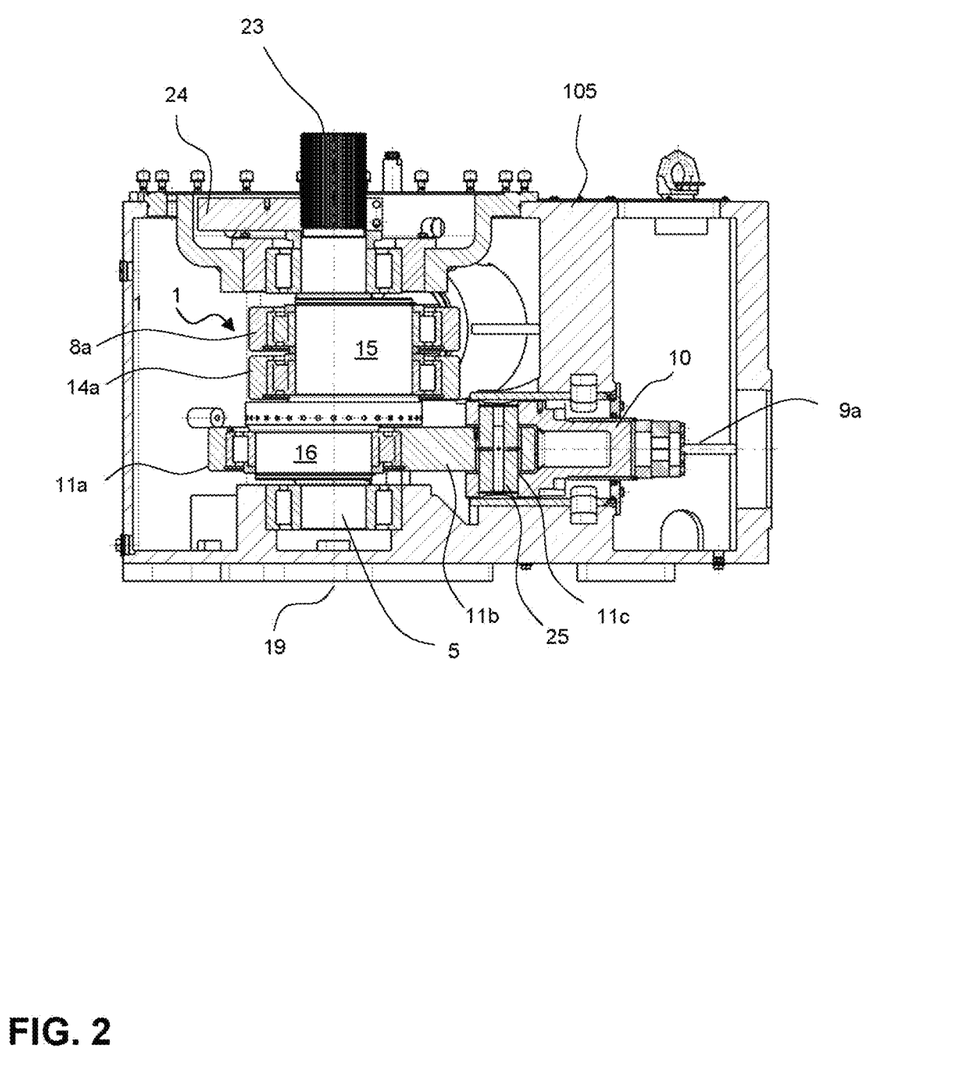
FIG. 2 schematically shows a section through a part of the process pump shown in FIG. 1.

A section through the casing 105 (without the drive 101) is illustrated in FIG. 2. There is seen how the crank mechanism 1 in the mounted and operational state of the process pump 100 is supported within the casing 105. Now in the following the crank mechanism 1 with its details is explained in more detail.

Figure 3:
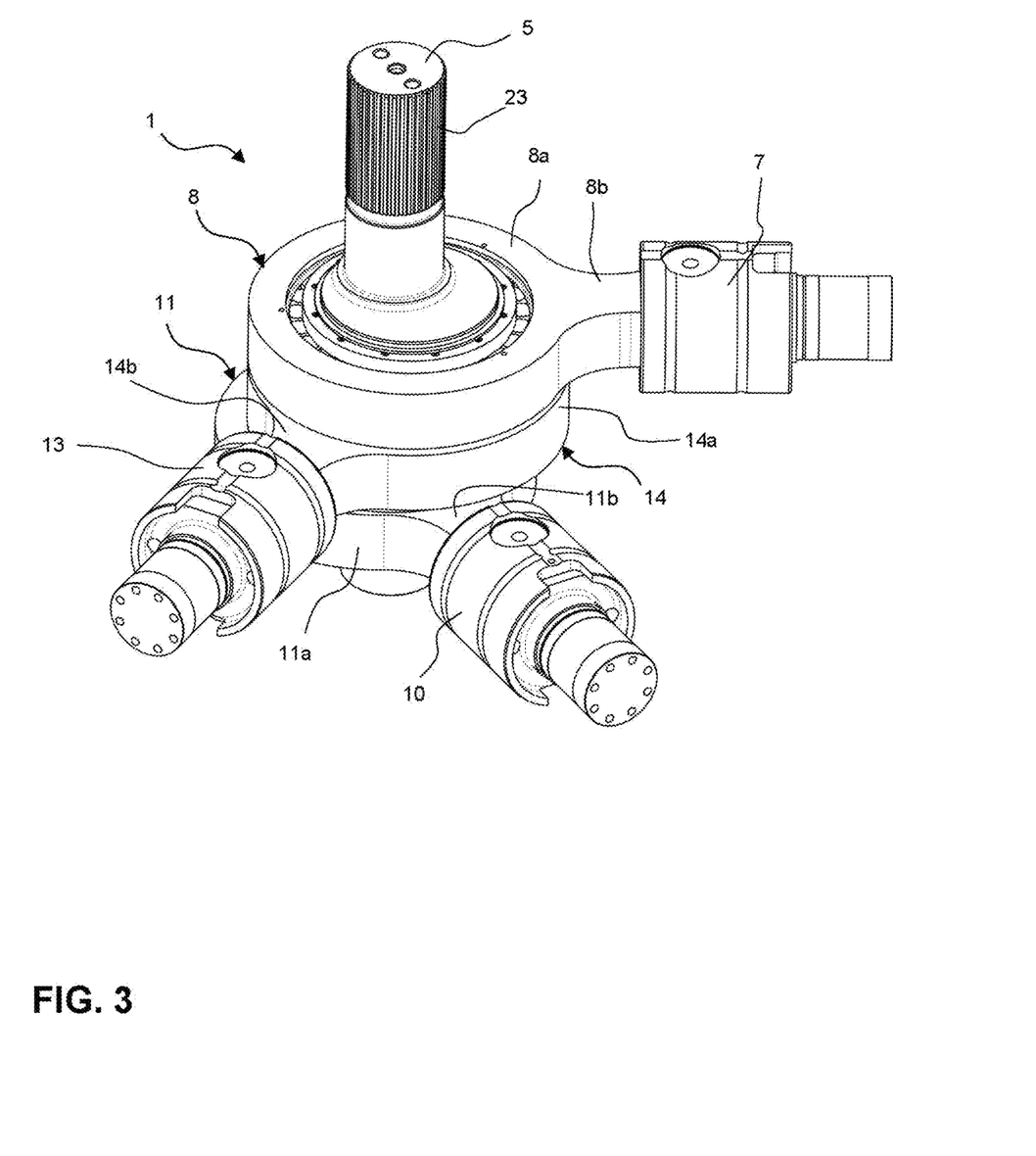
FIG. 3 schematically shows a perspective view of a crank mechanism according to the present invention and the respective connecting rods and crossheads.
Figure 4:
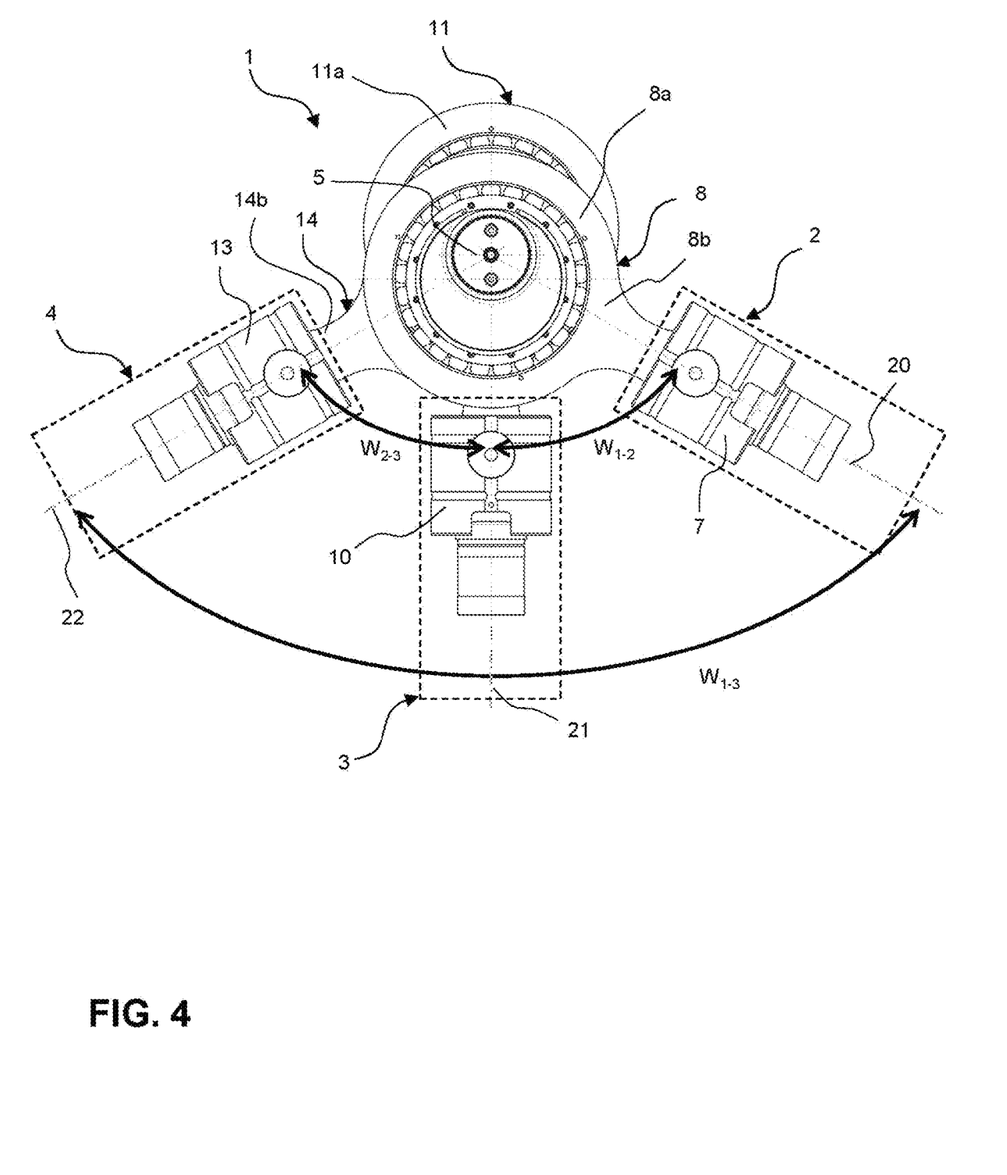
FIG. 4 schematically shows a plan view of the crank mechanism shown in FIG. 3.
Figure 5:
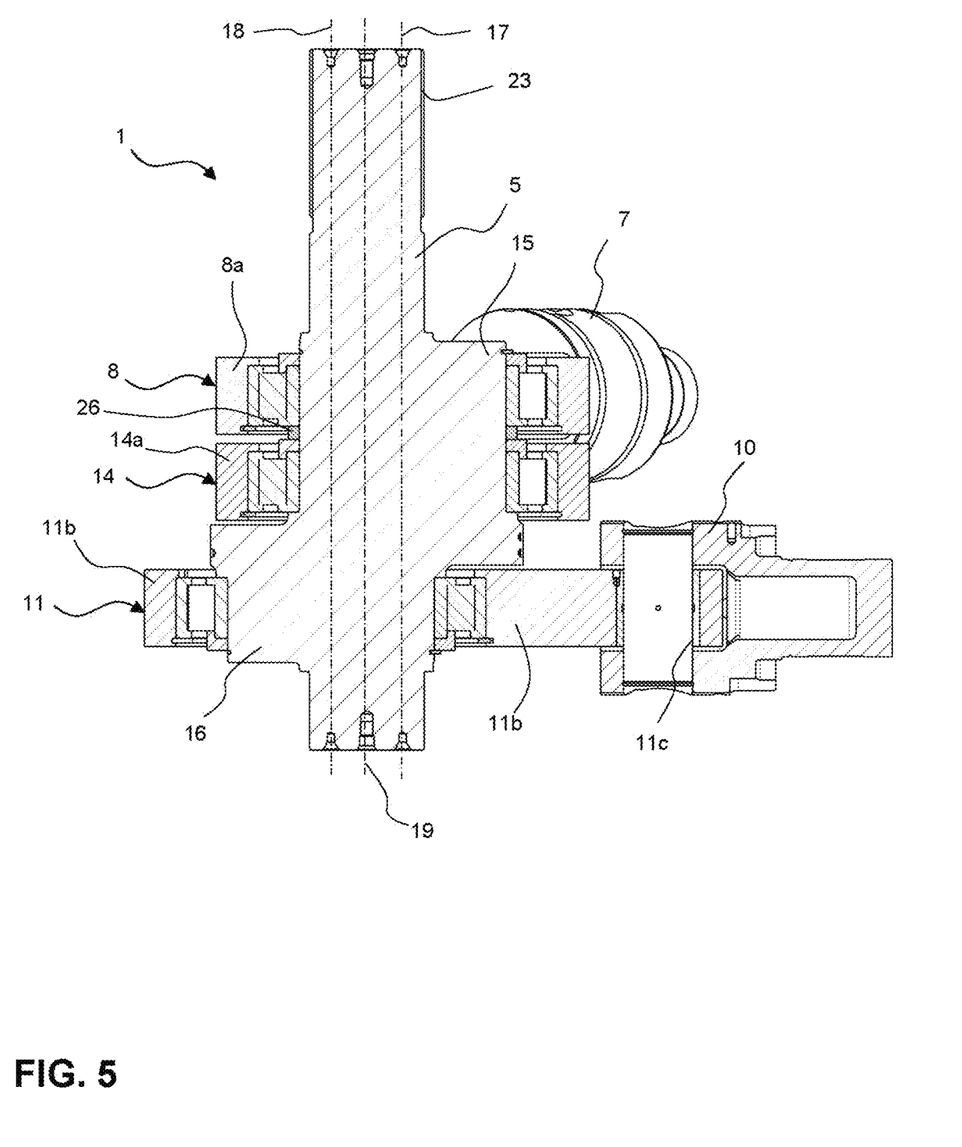
FIG. 5 schematically shows a section through the crank mechanism shown in FIG. 3.
Figure 9:
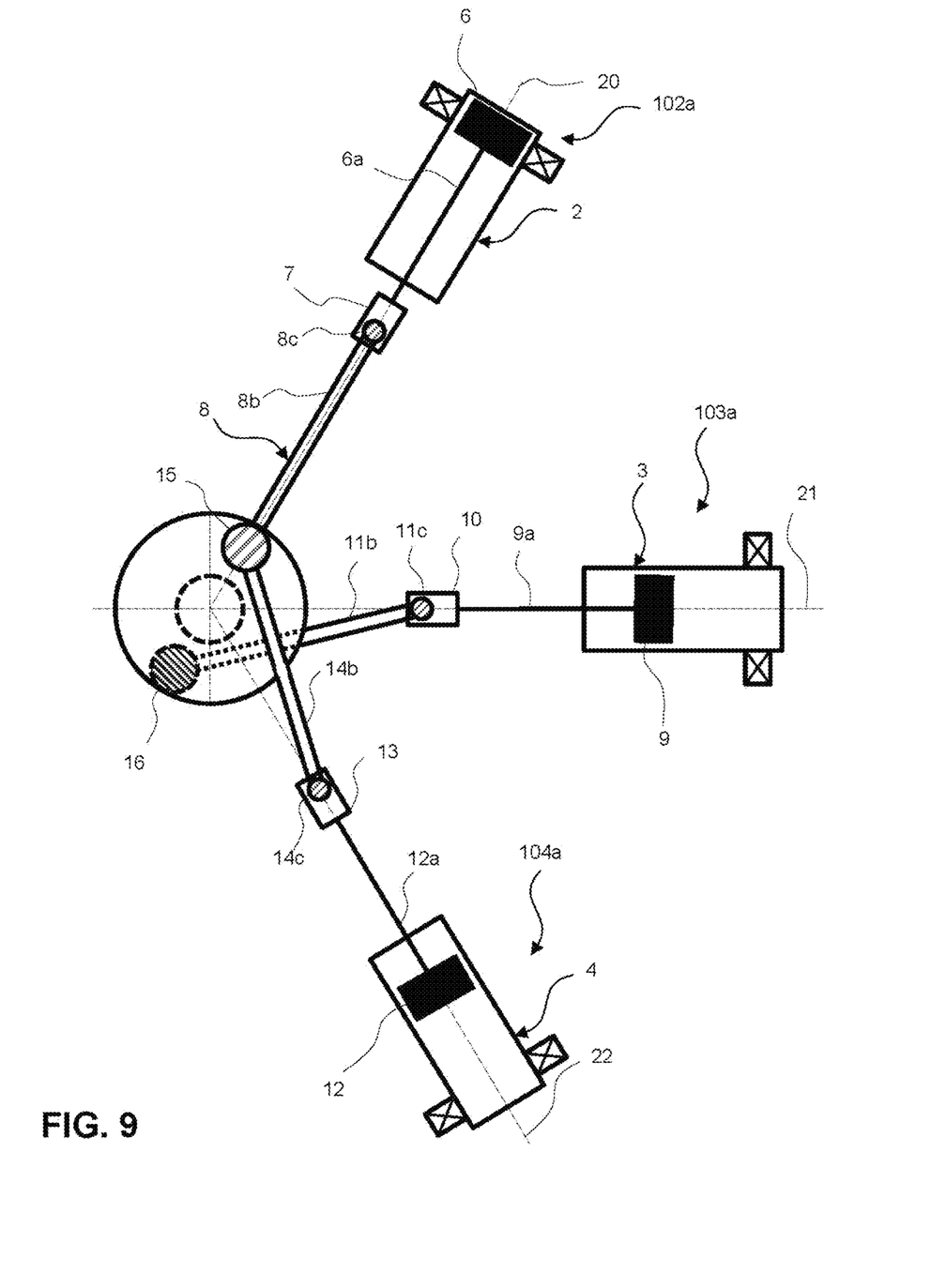
FIG. 9 schematically shows a schematic representation of the principle of a process pump according to the present invention with single-acting pump heads.

In FIG. 3 to FIG. 5 a crank mechanism 1 according to the present invention is illustrated in different views and as a section, respectively. The crank mechanism 1 has a one-piece crankshaft formed as an eccentric shaft 5 with which the three cylinders 2, 3, 4 are driven. In FIG. 4, cylinders 2, 3, 4 are indicated by the dotted boxes. Cylinders 2, 3, 4 each have a piston 6, 9, 12 with a piston rod 6a, 9a, 12a (cf. FIG. 7 and FIG. 9) that each is connected via a crosshead 7, 10, 13 to a one-piece connecting rod 8, 11, 14 each. Via the crossheads 7, 10, 13 pivoting connecting rods 8, 11, 14 are connected with pistons 6, 9, 12 that can only be moved linearly, so that from an initially rotational motion of the eccentric shaft 5 there results a linear motion of the pistons 6, 9, 12. As can be seen well from FIGS. 3 to 5, the connecting rods 8, 11, 14 and the accompanying crossheads 7, 10, 13 are constructed identically.

That is, when viewed clockwise or counterclockwise around the crank mechanism 1 or the eccentric shaft 5, respectively, i.e. along the central or rotational axis 19 of the eccentric shaft 5, there is a first cylinder 2 having a first piston 6 that is functionally connected to the eccentric shaft 5 via a first crosshead 7 and via the first connecting rod 8. This is followed by the second cylinder 3 having the second piston 9 when viewed clockwise or counterclockwise that is also functionally connected to the eccentric shaft 5 via the second crosshead 10 and the second connecting rod 11. Then, when viewed clockwise or counterclockwise, this is followed by the third cylinder 4 having the third piston 12 that is functionally connected to the eccentric shaft 5 via the third crosshead 13 and the third connecting rod 14.

The connecting rods 8, 11, 14 each have a large connecting rod top end 8a, 11a, 14a, a connecting rod shank 8b, 11b, 14b, and a small connecting rod top end 8c, 11c, 14c on which the respective crossheads 7, 9, 11 are arranged by means of a bolt 25. For example, this is apparent from the sectional views according to FIG. 2 and FIG. 5, wherein the arrangement, illustrated here only for the second cylinder 3, is identically realized for the first cylinder 2 and the third cylinder 4.

Figure 6:
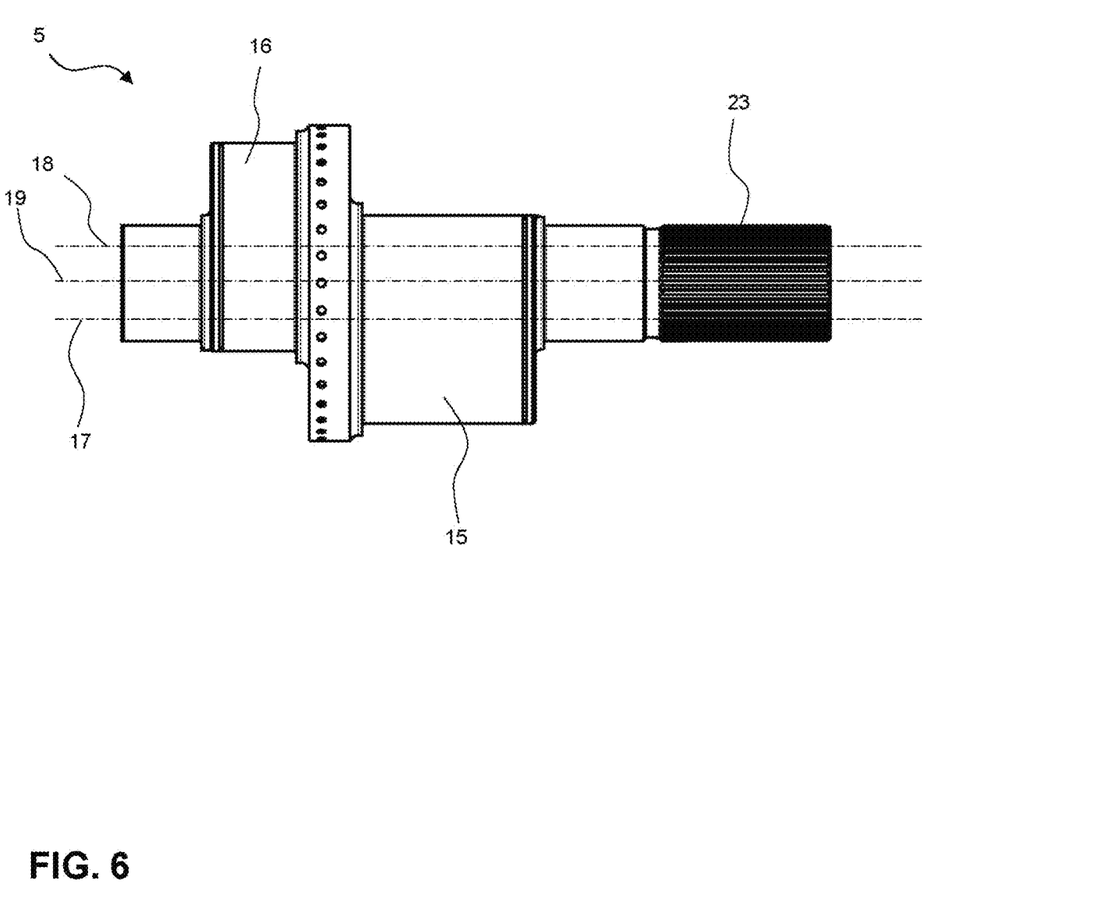
FIG. 6 schematically shows a side view of an eccentric shaft of a crank mechanism according to the present invention.

The eccentric shaft 5 has a first eccentric 15 and a second eccentric 16 in the form of eccentric discs, as can be seen well in FIG. 6. The first eccentric 15 and the second eccentric 16 are arranged on eccentric shaft 5 by an offset of 180°. On the first eccentric 15 there are supported the large connecting rod top end 8a of the first connecting rod 8 as well as the large connecting rod top end 14a of the third connecting rod 14. On the second eccentric 16 there is supported only the large connecting rod top end 11a of the second connecting rod 11. As is apparent for example from FIG. 5 the large connecting rod top ends 8a, 11a, 14a are supported on the eccentric shaft 5 and on the first eccentric 15 or second eccentric 16, respectively, via rolling bearings (in this example via cylindrical rolling bearings). The use of sliding bearings is also conceivable.

As is particularly well apparent from FIG. 5, the distance in the axial direction of the eccentric shaft 5 between the connecting rod 8 of the first cylinder 2 and the connecting rod 14 of the third cylinder 4 is low and is caused by a sliding disc 26.

According to the invention, the first eccentric 15 and the second eccentric 16 have a rotational axis 17 and 18, respectively, that is offset from the rotational or central axis 19 of the eccentric shaft 5, see for example FIG. 5 or FIG. 6. As described above, the first cylinder 2 and the third cylinder 4 are driven by the first eccentric 15, so that the connecting rod 8 of the first cylinder 2 and the connecting rod 14 of the third cylinder 3 have a common central axis 17.

According to the invention, the cylinders 2, 3, 4 are arranged with respect to each other such that their axes 20, 21, 22 (see for example FIG. 4) each are in an angular offset of 60° with respect to each other. Here, the first cylinder 2 is in an angular offset $W_{1-2}$ to the directly adjacent second cylinder 3 of 60°, wherein the third cylinder 4 also is in an angular offset $W_{2-3}$ to the directly adjacent second cylinder 3 of 60°. This results in an angular offset $W_{1-3}$ between the first cylinder 2 and the third cylinder 4 of 120° in total. This also results in the fact that the control sequence of the cylinders is such that at first the first cylinder 2 is controlled, then the third cylinder 4 and subsequently the second cylinder 3, before the control begins anew, when the eccentric shaft 5 has performed one rotation.

In order to counter the unbalances occurring during operation the crank mechanism 1 has a balancing mass 24 arranged on the eccentric shaft 5. As illustrated in FIG. 2, the eccentric shaft 5 for receiving the balancing mass 24 has a tooth system 23 upstream of the first cylinder 2 when viewed in an axial direction. The balancing mass 24 can be put onto this tooth system 23, as shown in FIG. 2. In the installed state of the crank mechanism 1 the balancing mass 24 that for example can have a slotted end with an radially-acting fastening element to secure the balancing mass 24 in the axial location on the eccentric shaft 5 is placed on said tooth system 23. Further, via the tooth system 23 of the eccentric shaft 5 also the crank mechanism 1 can be driven.

As is well apparent from FIG. 2, the crank mechanism 1 can easily be installed due to the one-piece eccentric shaft 5 and the one-piece connecting rod 8, 11, 14. For that, at first the connecting rod 11 and crosshead 10 of the second cylinder 3 are mounted. Then, the eccentric shaft 5 is installed into the casing 105, so that subsequently the connecting rod 14 and the crosshead 13 of the third cylinder 4, then the connecting rod 8 and the crosshead 7 of the first cylinder 2 and finally the balancing mass 24 can be mounted.

Then, the casing 105 is closed and the remaining components of the process pump 100 according to the present invention are mounted.

Figure 7:
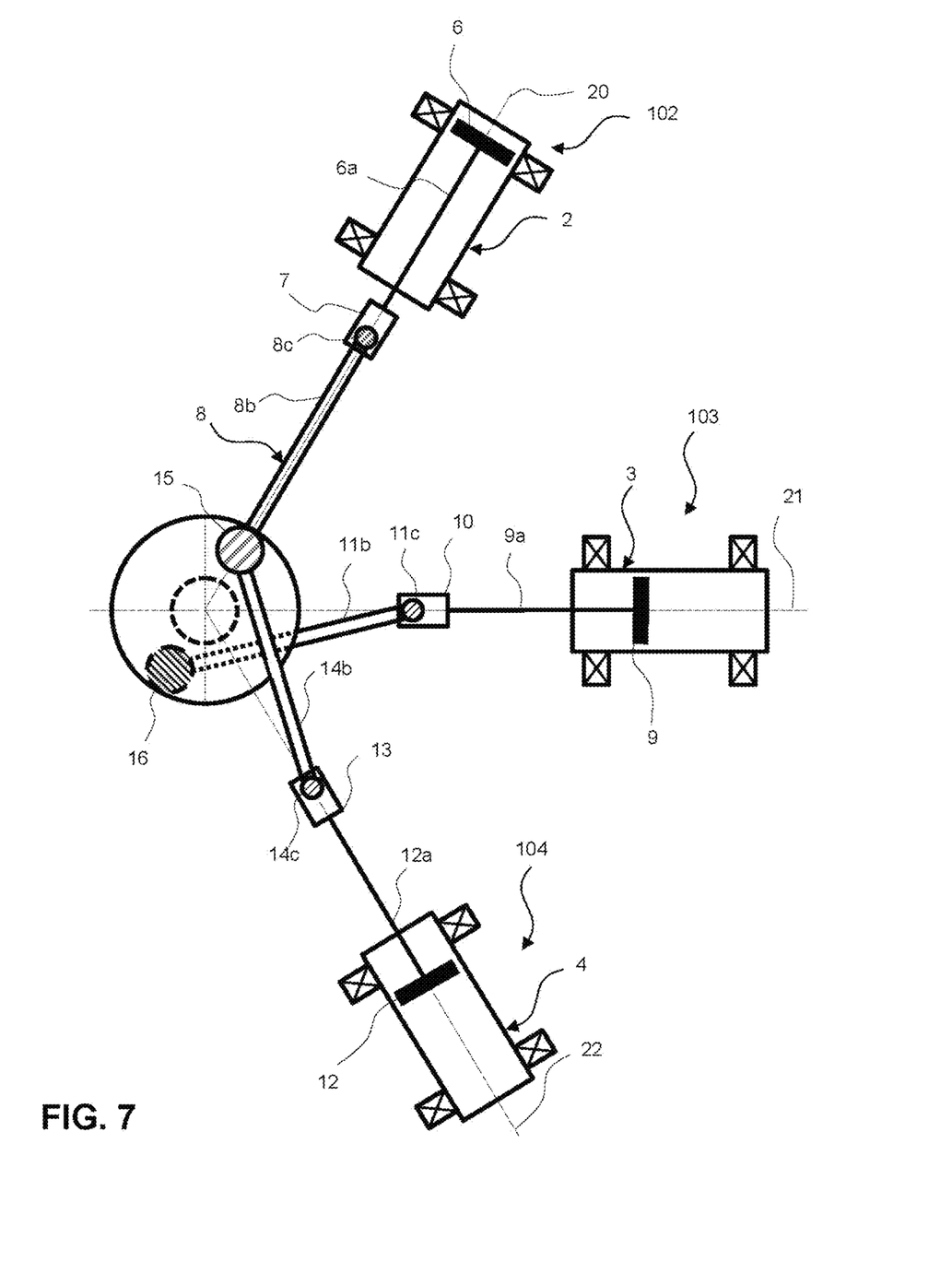
FIG. 7 schematically shows a schematic representation of the principle of a process pump according to the present invention with double-acting pump heads.

In a process pump 100 according to the present invention double-acting pump heads 102, 103, 104 (cf. FIG. 7) or single-acting pump heads 102a, 103a, 104a (cf. FIG. 9) can be used as the pump heads, in particular in the form of membrane pump heads. An advantage of the process pump 100 according to the present invention is that with the control sequence first cylinder 2—third cylinder 4—second cylinder 3 both single-acting pump heads 102a, 103a, 104a and double-acting pump heads 102, 103, 104 can be used, without having to change the crank mechanism 1, and still a respective phase offset of 120° of the partial pump rates is achieved. The corresponding principle with double-acting pump heads 102, 103, 104 is schematically illustrated in FIG. 7, the corresponding principle with single-acting pump heads 102a, 103a, 104a in FIG. 9.

Figure 8:
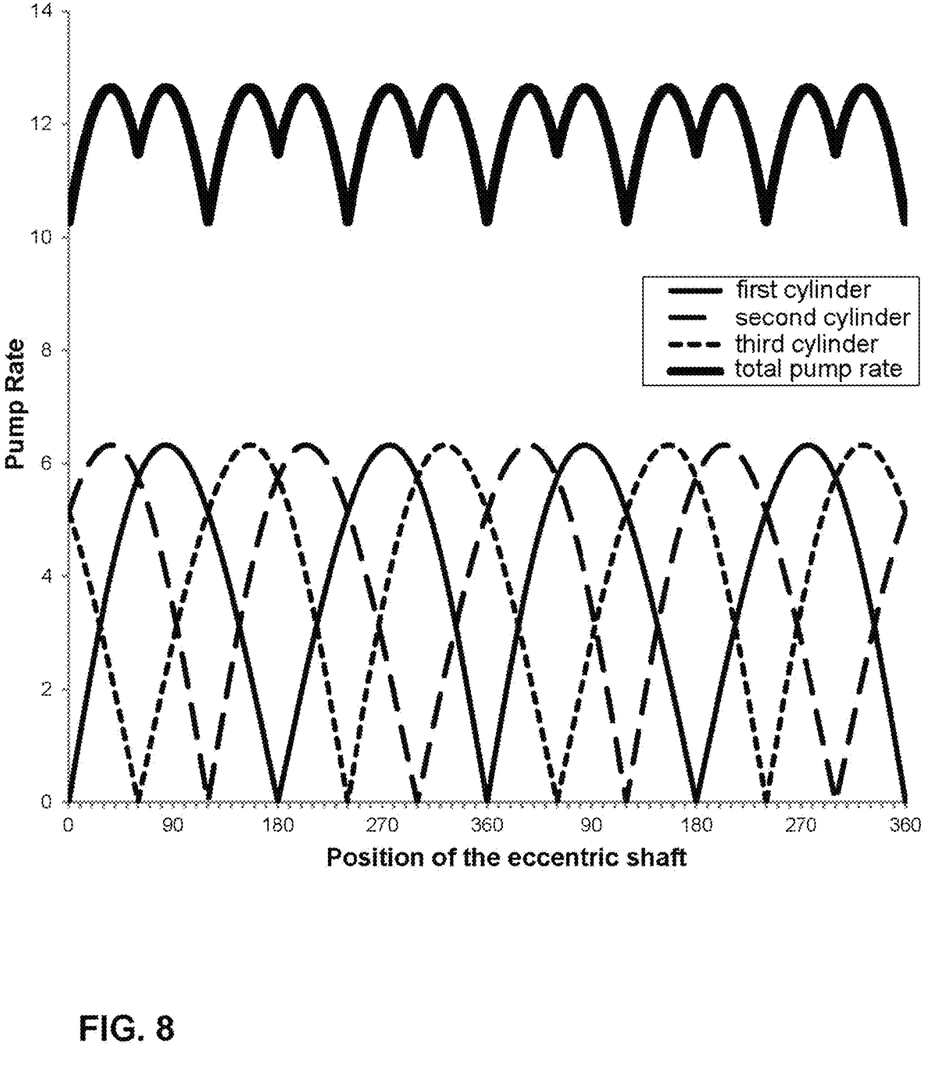
FIG. 8 schematically shows a pump rate chart for the principle shown in FIG. 7.

The individual pump rates of each of the cylinders 2, 3, 4 provided with double-acting pump heads 102, 103, 104 as well as the resulting total pump rate are illustrated in FIG. 8. On the abscissa there is given the position of the eccentric shaft 5 in degree [°], on the ordinate there is given the pump rate which generally has the unit amount or volume per unit of time [m$^3$/h]. The pump rate of the first cylinder 2 is illustrated as a continuous line, the pump rate of the second cylinder 3 is illustrated as a long-dashed line and the pump rate of the third cylinder 4 is illustrated as short-dashed line. The total pump rate resulting from the individual pump rates is illustrated as a thick line. Here, it can be seen that the resulting total pump rate is substantially homogeneous.

Figure 10:
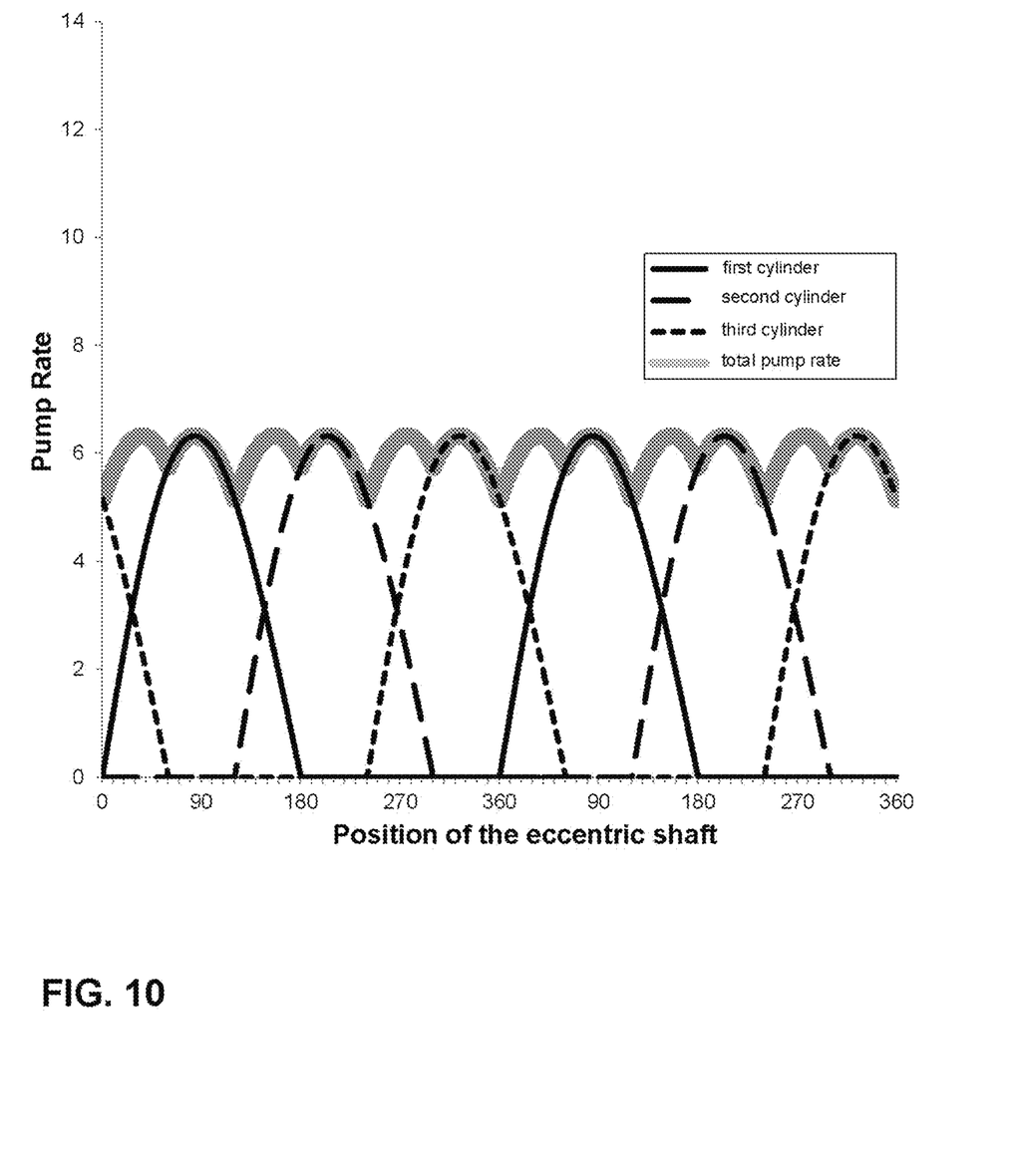
FIG. 10 schematically shows a pump rate chart of the principle shown in FIG. 9.

A corresponding chart with the individual pump rates of each of the cylinders 2, 3, 4 provided with single-acting pump heads 102a, 103a, 104a as well as the resulting total pump rate are illustrated in FIG. 10. The illustration is substantially identical to the illustration in FIG. 8, so that it is referred to the above. Also for the single-acting pump heads it can be seen that the resulting total pump rate illustrated in this image as a thick grey line is quite homogeneous and has only a small fluctuation.

LIST OF REFERENCE SYMBOLS 1 crank mechanism
2 first cylinder
3 second cylinder
4 third cylinder
5 eccentric shaft
6 piston of the first cylinder
6a piston rod
7 crosshead of the first cylinder
8 connecting rod of the first cylinder
8a large connecting rod top end
8b connecting rod shank
8c small connecting rod top end
9 piston of the second cylinder
9a piston rod
10 crosshead of the second cylinder
11 connecting rod of the second cylinder
11a large connecting rod top end
11b connecting rod shank
11c small connecting rod top end
12 piston of the third cylinder
12a piston rod
13 crosshead of the third cylinder
14 connecting rod of the third cylinder
14a large connecting rod top end
14b connecting rod shank
14c small connecting rod top end
15 first eccentric
16 second eccentric
17 central axis of the large connecting rod top ends of the connecting rods of the first and of the third cylinder/central axis of the first eccentric
18 central axis of the large connecting rod top end of the connecting rod of the second cylinder/central axis of the second eccentric
19 central or rotational axis of the eccentric shaft
20 axis of the first cylinder
21 axis of the second cylinder
22 axis of the third cylinder
23 tooth system
24 balancing mass
25 bolt
26 sliding disc
100 process pump
101 drive
101a electric motor
101b step-down gear
102 pump head of the first cylinder (double-acting)
102a pump head of the first cylinder (single-acting)
103 pump head of the second cylinder (double-acting)
103a pump head of the second cylinder (single-acting)
104 pump head of the third cylinder (double-acting)
104a pump head of the third cylinder (single-acting)
105 casing
106 pump lid
$W_{1-2}$ angular offset between first and second cylinder
$W_{2-3}$ angular offset between second and third cylinder
$W_{1-3}$ angular offset between first and third cylinder

The invention claimed is:

1. A process pump (100) having a crank mechanism (1) and at least three cylinders (2, 3, 4) that when seen around the crank mechanism (1) represent a first cylinder (2), a second cylinder (3) and a third cylinder (4), wherein the crank mechanism (1) has a crankshaft and for each cylinder (2, 3, 4) a crosshead (7, 10, 13) and a connecting rod (8, 11, 14), each connecting rod having a large connecting rod top end (8a, 11a, 14a) being received by the crankshaft, wherein the crossheads (7, 10, 13) are functionally connected to the crankshaft via the connecting rods (8, 11, 14),
  characterized in that
  the crankshaft is formed as an eccentric shaft (5) with a first eccentric (15) and a second eccentric (16), wherein the connecting rod (8) of the first cylinder (2) and the connecting rod (14) of the third cylinder (4) are arranged on the first eccentric (15), and wherein the connecting rod (11) of the second cylinder (3) is arranged on the second eccentric (16), so that the large connecting rod top end (8a) of the connecting rod (8) of the first cylinder (2) and the large connecting rod top end (14a) of the connecting rod (14) of the third cylinder (4) have a common central axis (17);
  a plurality of axes (20, 21, 22) of adjacent cylinders (2, 3, 4) have an angular offset ($W_{1-2}$, $W_{2-3}$) of 60° to each other, wherein each of the plurality of axes are projected onto a common plane disposed perpendicularly to a rotational axis of the eccentric shaft;
  the angular offset ($W_{1-3}$) between the axis (20) of the first cylinder (2) and the axis (22) of the third cylinder (4) is 120°;
  a balancing mass (24) is arranged on the eccentric shaft (5); and
  the first eccentric (15) and the second eccentric (16) are arranged on the eccentric shaft (5) by an offset of 180°, wherein the common plane has a vertical and a horizontal axis (21) in which the vibrations are reduced.

2. The process pump (100) according to claim 1, characterized in that the process pump (100) has exactly three cylinders (2, 3, 4).

3. The process pump (100) according to claim 1, characterized in that at least one of the two eccentrics (15, 16), is formed as an eccentric disc.

4. The process pump (100) according to claim 1, characterized in that
the connecting rods (8, 11, 14) each have a connecting rod shank (8*b*, 11*b*, 14*b*) and a small connecting rod top end (8*c*, 11*c*, 14*c*) for functional connection with the crossheads (7, 10, 13), wherein the large connecting rod top end (8*a*, 11*a*, 14*a*), the connecting rod shank (8*b*, 11*b*, 14*b*), and the small connecting rod top end (8*c*, 11*c*, 14*c*) are formed as one piece.

5. The process pump (100) according to claim 1, characterized in that
the eccentric shaft (5) is formed as one piece.

6. The process pump (100) according to claim 1, characterized in that the balancing mass (24) is the only balancing mass arranged on the eccentric shaft (5).

7. The process pump (100) according to claim 1, characterized in that
the process pump (100) has at least one pump head formed as a single-acting (102*a*, 103*a*, 104*a*) or double-acting pump head (102, 103, 104).

8. The process pump (100) according to claim 1, characterized in that both of the two eccentrics (15, 16), are each formed as a respective eccentric disc.

9. The process pump (100) according to claim 1, characterized in that the eccentric shaft is configured for receiving the balancing mass upstream of the first cylinder when viewed in an axial direction.

10. The process pump (100) according to claim 1, wherein the balancing mass comprises a radially acting fastening element to secure the balancing mass on the eccentric shaft.

* * * * *